UNITED STATES PATENT OFFICE.

JOHN M. WEISS, OF NEW YORK, N. Y., AND CHARLES R. DOWNS, OF CLIFFSIDE, NEW JERSEY, ASSIGNORS TO THE BARRETT COMPANY, A CORPORATION OF WEST VIRGINIA.

PRODUCTION OF DIPHENYL.

1,322,983.     Specification of Letters Patent.     Patented Nov. 25, 1919.

No Drawing.     Application filed January 5, 1918. Serial No. 210,553.

*To all whom it may concern:*

Be it known that we, JOHN M. WEISS and CHARLES R. DOWNS, citizens of the United States, residing at (1) 210 West 110th street and (2) Cliffside, in the counties of (1) New York and (2) Bergen and States of (1) New York and (2) New Jersey, have invented certain new and useful Improvements in the Production of Diphenyl, of which the following is a specification.

This invention relates to the production of diphenyl from benzene in a novel and highly advantageous manner.

The invention is based upon the discovery that the amount of diphenyl obtainable from benzene can be very materially increased by subjecting the vaporized benzene to a high temperature and pressure, in admixture with diluent gas or vapor, such as steam, and that the production of the diphenyl can further be promoted by treating the benzene in the presence of appropriate substances which provide cracking surfaces, such as, for example, pumice.

It is well known that certain amounts of diphenyl can be formed by the pyrogenic decomposition of benzene in its own atmosphere; but the production is accompanied by the decomposition of part of the benzene vapors and deposition of carbon therefrom.

According to the present invention the production of diphenyl from benzene is effected without objectionable carbon formation, and without objectionable loss of benzene, while the proportion of benzene which is converted into diphenyl is at the same time materially increased. The invention will be described more in detail in connection with the following specific description.

Benzene is vaporized and the vapors mixed with steam in proper proportion, and the mixed vapors then passed into a heated reaction chamber containing a distributing agent. The proportions of steam and of benzene may be varied within rather wide limits. We have obtained good results with amounts of water (in the form of steam) equal to, or somewhat greater than the amount of benzol (by volume) for example, 23 parts by volume of benzol to 27 parts by volume of water, but we have also obtained good results with proportions varying materially from these particular proportions.

The temperature at which the reaction is carried out may likewise vary depending upon such circumstances as the particular contact or distributing substance used and the nature of the cracking surfaces provided thereby, the proportions of steam and benzene, and the speed at which the gases are passed through the apparatus. We have found temperatures around 600° to 800° C. or thereabove, as suitable for the carrying out of the process, and have obtained improved yields at around 700° C. and around 815° C. (1500° F.), and at an elevated pressure, for example, of 60 pounds per square inch (above atmospheric).

The pressure, however, can also be varied within rather wide limits, and the process can even be carried out at atmospheric pressure. Increased pressures, however, seem to be more advantageous and beneficial in giving increased yields of the diphenyl. Thus we have obtained good results by using a mixture of about 23 parts by volume of benzol and 27 parts by volume of water (in the form of steam) and by passing the mixture through a mass of pumice at a temperature of about 690° C., and at a pressure of about 60 pounds per square inch (above atmospheric). Other substances may be used as a contact or distributing substance, in a similar manner.

The steam serves to dilute the benzene vapors, and has a blanketing or protecting effect, so that a higher temperature may be used without objectionable decomposition and formation of by-products, and so that the heated cracking surfaces of the contact or distributing substance are kept substantially free from objectionable carbon deposit. So, also, the increased temperatures and pressures are favorable to the increased yields of diphenyl.

It will be evident that various forms and types of apparatus are available for carrying out the process and for containing the contact or distributing substances, such as pumice, etc. So, also, the apparatus may be heated in any suitable manner, as by electrical resistance, or by direct flame, or otherwise. The pumice acts as a contact or distributing substance and serves to break up the vapor streams and to bring about uniformity of reaction. Instead of the pumice, other substances may be used which serve as contact or distributing substances, or which provide proper cracking surfaces, or which exert a favorable influence upon the desired condensation reaction. Iron oxid, when used, is to some extent reduced during the process.

The product of the reaction, after liquefaction in a suitable condenser, separates into two layers, one an equeous layer and the other a hydrocarbon layer containing the diphenyl and the unchanged benzene. These layers can be readily separated and the benzene distilled off from the diphenyl. The benzene is thus recovered and can be returned to the process, while the diphenyl is at the same time obtained, as the result of a single distillation, in a relatively pure state.

The preliminary evaporation of the benzene and its admixture with the steam may be effected in any suitable manner, and any appropriate means may be used for insuring that the benzene vapor and steam are mixed in proper proportions and with sufficient uniformity. Steam may thus be utilized to vaporize and distil the benzene, and the resulting mixed vapors of steam and benzene may, if necessary, be further modified by further additions of steam. Again, the benzene may be separately vaporized and the vapors brought into admixture with the steam at or before the beginning of the condensation reaction.

We claim:

1. A method of producing diphenyl from benzene, which comprises subjecting benzene vapor, in admixture with steam, to a temperature sufficient to bring about the desired condensation reaction.

2. A method of producing diphenyl from benzene, which comprises subjecting benzene vapor, in admixture with steam, and in the presence of a contact substance, to a temperature sufficient to bring about the desired condensation reaction.

3. A method of producing diphenyl from benzene, which comprises subjecting benzene vapor, in admixture with steam, to a high temperature and pressure sufficient to bring about the desired condensation reaction.

4. A method of producing diphenyl from benzene, which comprises subjecting benzene vapor, in admixture with steam, and in the presence of a contact substance, to a temperature and pressure sufficient to bring about the desired condensation reaction.

5. A method of producing diphenyl from benzene, which comprises subjecting benzene vapor, in admixture with steam, and in the presence of a contact substance, to a temperature of about 690° C., and a pressure of about 60 pounds per square inch above atmospheric.

6. A method of producing diphenyl from benzene, which comprises subjecting benzene vapors, in admixture with steam, and in the presence of a contact substance, to a temperature and pressure sufficient to bring about the desired condensation reaction, condensing the vapors, distilling off the unchanged benzene, and again subjecting the benzene vapors to the condensation reaction.

7. The process of producing relatively pure diphenyl, which comprises subjecting benzene vapors in the presence of steam and a contact substance to a high temperature at a pressure above atmospheric, condensing the vapors, and distilling off the benzene.

In testimony whereof we affix our signatures.

JOHN M. WEISS.
CHARLES R. DOWNS.